United States Patent [19]

Collins

[11] Patent Number: 5,441,091
[45] Date of Patent: Aug. 15, 1995

[54] ROLLER SUPPORT FOR SAW WORKPIECE

[76] Inventor: Richard M. Collins, 5300 NW. 66th Pl., Johnston, Iowa 50131

[21] Appl. No.: 997,518

[22] Filed: Dec. 28, 1992

[51] Int. Cl.⁶ .................................................. B25H 1/00
[52] U.S. Cl. ........................................ 144/287; 182/181;
       182/224; 144/286 R; 193/42; 269/289 MR
[58] Field of Search ................... 269/289 MR; 193/42;
       182/181, 224; 144/286 A, 287

[56] References Cited

U.S. PATENT DOCUMENTS

| | | | |
|---|---|---|---|
| 1,658,826 | 2/1928 | Yerk et al. | |
| 2,517,112 | 8/1950 | Jones | 144/286 |
| 2,722,243 | 11/1955 | Nagy | 144/286 R |
| 2,766,788 | 10/1956 | Kahn | 144/286 |
| 4,039,064 | 8/1977 | Kirby | 269/289 MR |
| 4,753,279 | 6/1988 | Harris | 193/42 |
| 4,785,911 | 11/1988 | Kayl | 269/289 MR |
| 4,852,623 | 8/1989 | Rodrigues | 269/289 MR |
| 4,974,651 | 12/1990 | Cammon et al. | 144/287 |
| 5,247,976 | 9/1993 | Matthews | 144/287 |
| 5,320,150 | 6/1994 | Everts et al. | 144/287 |

FOREIGN PATENT DOCUMENTS

| | | | |
|---|---|---|---|
| 105399 | 6/1898 | Germany | 182/181 |
| 342729 | 7/1921 | Germany | 182/181 |

Primary Examiner—W. Donald Bray

[57] ABSTRACT

A roller support attachment is mounted on the cross piece of a conventional sawhorse through the use of a pair of bolts. Each of the bolts extends through slots in the side plates of the attachment and through holes in the cross piece of the sawhorse. In an alternate embodiment one bolt extends through an elongated slot in the side plates of the attachment and through a hole in the cross piece of the sawhorse while the second bolt extends through the side plates and rests on top of the cross piece of the sawhorse. The elongated slots may be straight or arcuate. An inverted channel shaped member may be positioned on a plurality of spaced apart rollers and move with the work piece as it moves through the saw.

16 Claims, 3 Drawing Sheets

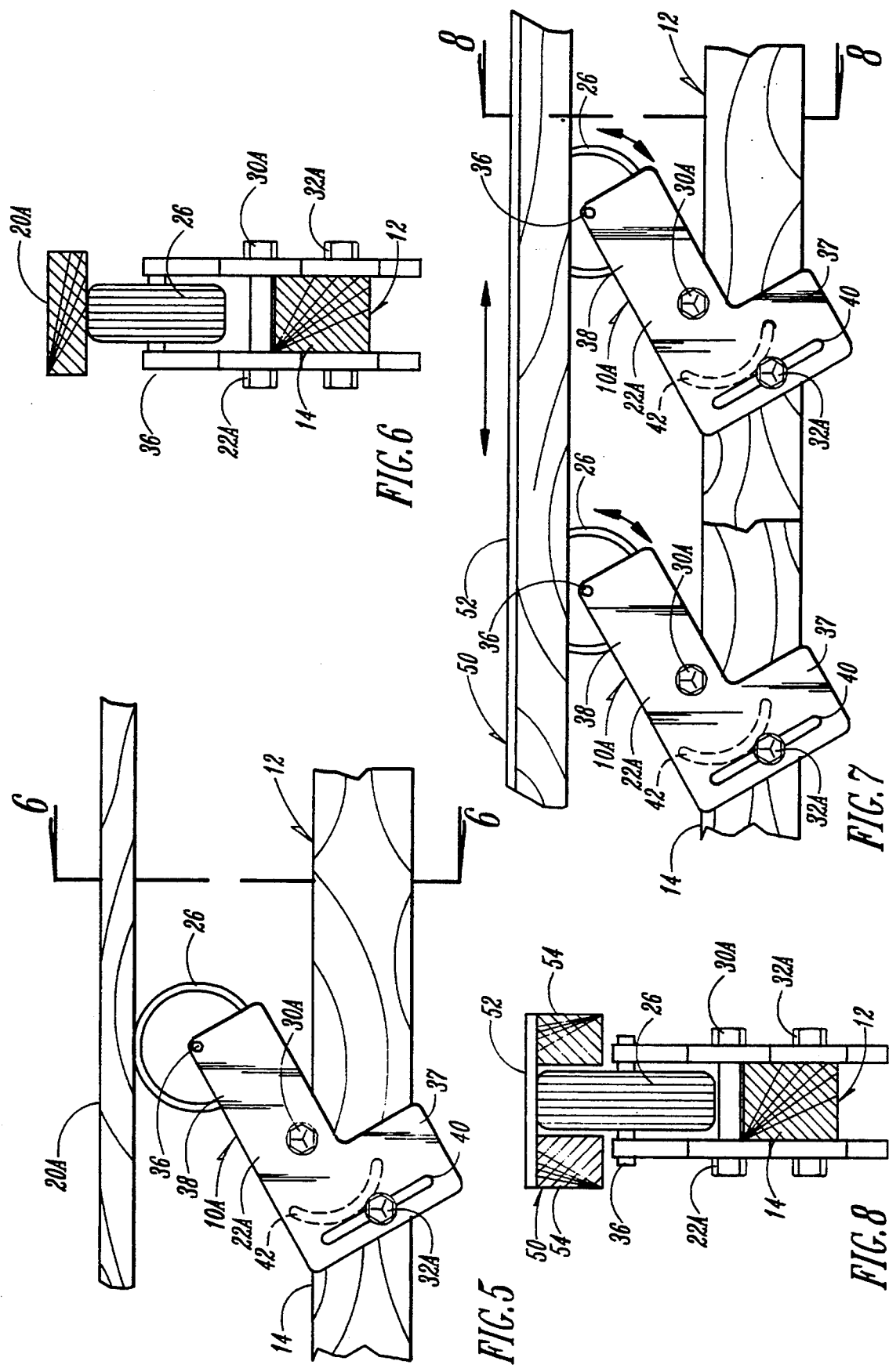

ROLLER SUPPORT FOR SAW WORKPIECE

BACKGROUND OF THE INVENTION

When a large work piece is being cut by a table saw, radial arm saw or power mitre box, supplemental support for the work piece must be provided to assure safe and accurate cutting of the work piece.

An extension table for a saw may be provided as disclosed in the Rodrigues U.S. Pat. No. 4,852,623. This extension table is pivotally mounted to the saw support stand. A free standing roller support attachment for work benches is shown in the Harris U.S. Pat. No. 4,753,279.

The prior art supplemental work piece support devices all suffer from the fact that they are complicated to use and manufacture and expensive to buy for the home workshop operator.

What is needed is an attachment that can be mounted on a conventional sawhorse that is simple in construction, effective in providing the required supplemental support and simple to manufacture and inexpensive to buy.

SUMMARY OF THE INVENTION

This invention starts with the conventional sawhorse having a single horizontal cross member supported at opposite ends by A-frame legs. A support attachment is mounted on the sawhorse horizontal cross member. The attachment includes a pair of spaced apart side plates open at their bottom end and having a roller mounted on the top end. The side plates straddle the sawhorse cross member and a pair of bolts allow for adjustable positioning of the support roller under the work piece extending beyond the saw table.

In one embodiment a pair of straight elongated slots are provided in the side plates and a pair of bolts extend through the slots and through the sawhorse cross member. In another embodiment one of the bolts extends through the cross member and through an elongated slot which may be either straight or curved in the side plates. The second bolt extends through the side plates but is positioned on top of the cross member allowing quick adjustment for positioning of the roller as required. At the same time a minimum of modification to the sawhorse is required as only one hole through the cross member is required.

The roller may be connected by a swivel to the top end of the side plates which are angled upwardly away from a vertical plane and away from the advancing work piece such that the roller will be positioned by gravity away from the work piece for immediate alignment with the work piece when contact is made.

A moving table arrangement can be provided by utilization of a downwardly facing elongated channel member positioned on two or more of horizontally spaced apart rollers located between the side walls forming the channel. The work piece is supported by the moving table and as the work piece moves through the saw the work piece frictionally moves the moving table over the rollers. This arrangement provides continuous support along the bottom side of the work piece beyond the saw table.

DESCRIPTION OF THE DRAWINGS

FIG. 5 is a fragmentary side elevational view of a modified roller support attachment utilizing one bolt extending through the cross member of the sawhorse and a second bolt on top of the cross member.

FIG. 6 is a cross sectional view taken along line 6—6 in FIG. 5.

FIG. 7 is a fragmentary side elevational view of the roller support attachment of FIGS. 5 and 6 supporting an inverted elongated channel moving table.

FIG. 8 is a cross sectional view taken along line 8—8 in FIG. 7

DESCRIPTION OF PREFERRED EMBODIMENT

Figure 1:
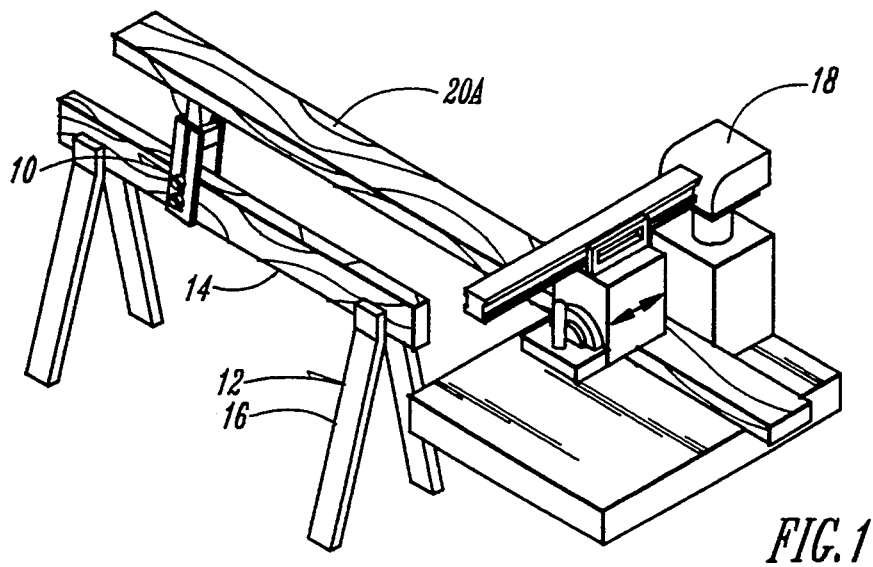
FIG. 1 is a perspective view of the support attachment of this invention mounted on a sawhorse for supporting a work piece being cross cut by a radial arm saw.

The roller attachment of this invention is referred to generally in FIG. 1 by the reference numeral 10 and is shown mounted on a sawhorse 12 having a horizontal cross member 14 supported at opposite ends by A-frame legs 16.

Figure 2:
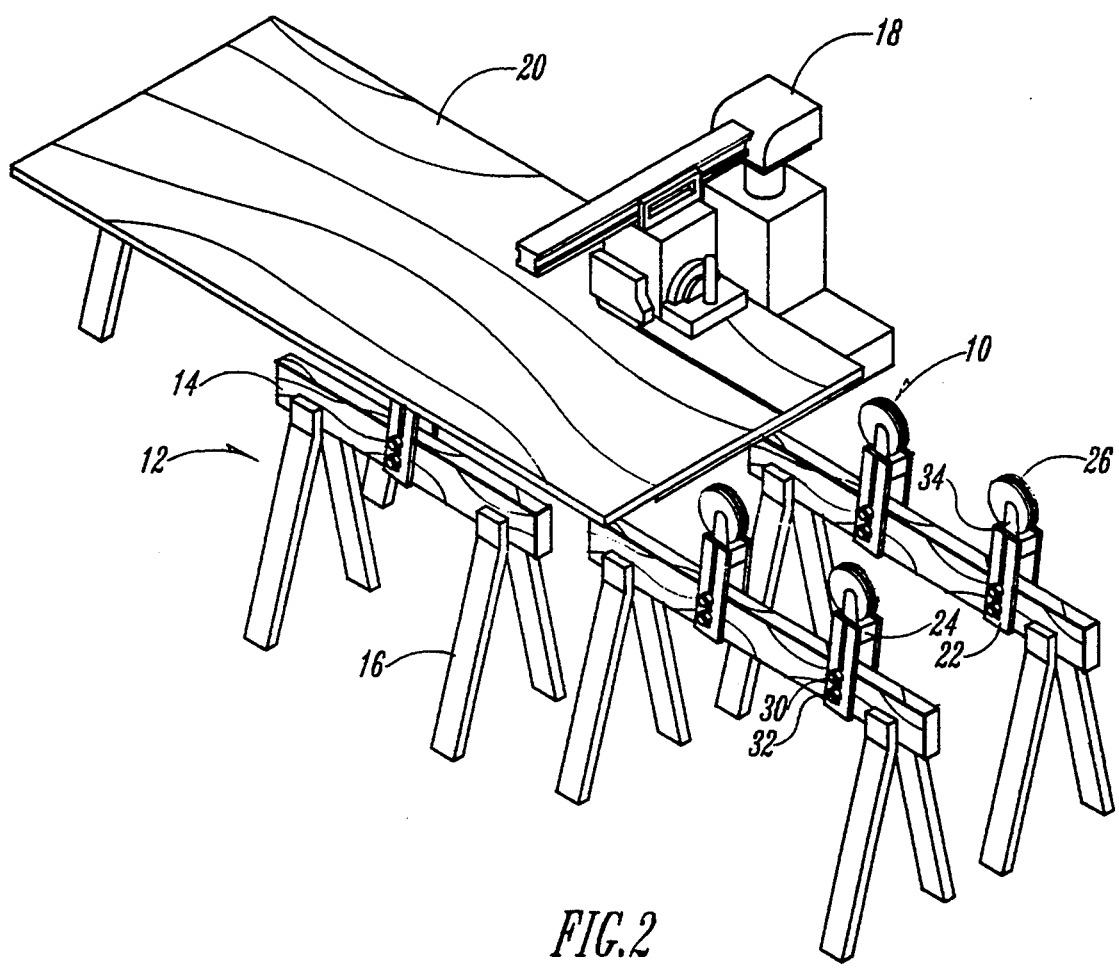
FIG. 2 is a view similar to FIG. 1 but showing a large flat work piece being supported by a plurality of rollers mounted on sawhorses allowing for lengthwise cutting of the work piece.

A radial arm saw 18 in FIG. 2 is positioned to cut lengthwise a large sheet work piece 20 being supported by a plurality of the roller support attachments 10.

Figure 3:
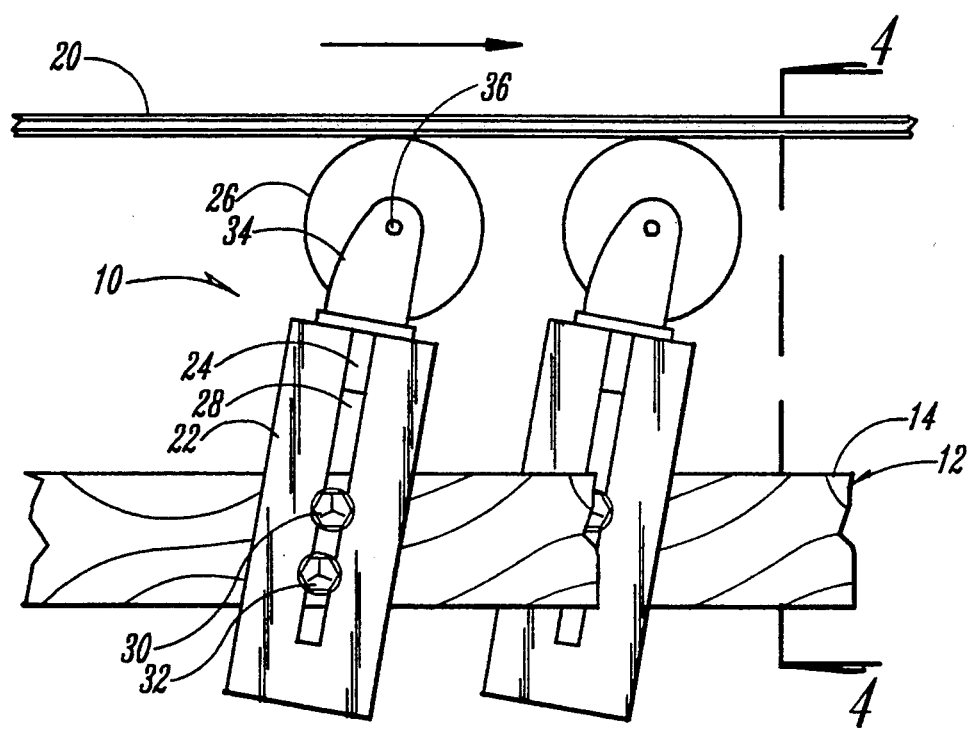
FIG. 3 is a side elevational view of the roller support attachments mounted on sawhorses and supporting a work piece and the rollers including casters.
Figure 4:
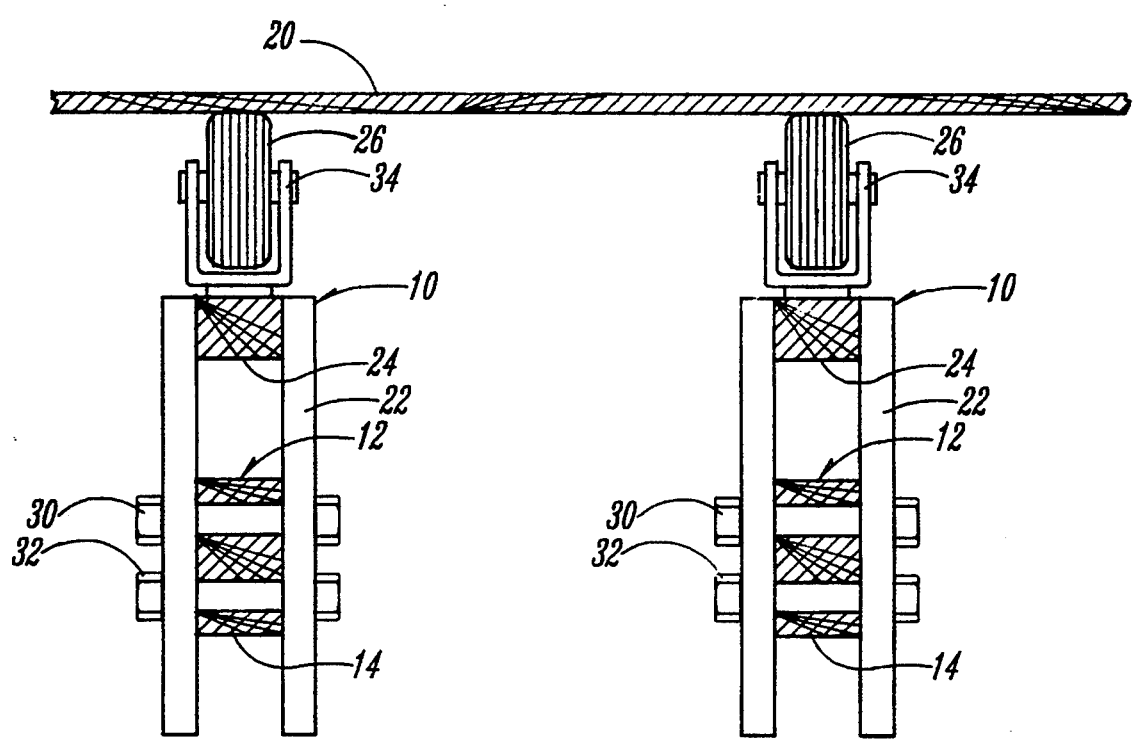
FIG. 4 is a cross sectional view taken along line 4—4 in FIG. 3.

The attachment 10 includes a plate assembly having a pair of spaced apart side plates 22 interconnected at their upper end by a block 24 which supports a roller 26. The lower end of the plate assembly is open to allow positioning of the attachment 10 on the cross piece 14 of the sawhorse 12. Each of the plates 22 includes an elongated straight slot 28 extending the substantial length thereof. A pair of bolts 30 and 32 extend through the aligned slots 28 and through the cross piece 14 for adjustably positioning and locking the attachment 10 in the desired vertical position under the work piece 20 as seen in FIG. 3.

The roller 26 is mounted by a caster 34 on the block 24 at the upper end of the side plates 22 which extend upwardly and away from the direction of the advancing work piece, as indicated by the arrow. The roller 26 will be oriented by gravity away from the advancing work piece such that it will automatically be aligned when contact is made.

In FIG. 1 it is seen that the saw 18 has its blade arranged for cross cutting a work piece 20A supported on the roller support attachment 10 on the sawhorse 12.

In FIGS. 5 and 6 a modified roller support attachment 10A is shown and includes a pair of side plates 22A having a roller 26 connected therebetween for rotation about an axle 36 extending therethrough. The side plates 22A are L-shaped and include legs 37 and 38. The leg 37 includes an elongated straight slot 40 and an arcuate slot 42 with either of them being adapted to receive a first bolt 32A while a second bolt 30A extends through the legs 38 and rests on the top side of the sawhorse cross member 14. The first bolt 32A extends through the cross member 14.

It is thus seen that a work piece 20A is supported by the roller 26 which is appropriately positioned through operation of the bolts 30A and 32A. The bolt 30A functions as a pivot for the rotation of the side plates 22A. Only one hole need be drilled in the cross member 14 when utilizing this embodiment and the device may be quickly attached and removed from the sawhorse 12.

In FIG. 7 the roller support attachments 10A are seen being used in connection with a moving table support 50 comprising an inverted channel shaped member having a top wall 52 and opposite sidewalls 54 straddling the rollers 26. It is seen in this embodiment that the work piece resting on top of the moving table 50 will cause the moving table to roll on the rollers 26 and move with the work piece while providing a continuous support under the work piece along its substantial length. The moving table may be on the order of six to eight feet in length.

Thus it is seen that a simplified extension table has been provided for use with any saw. The roller support attachment may be attached to any conventional sawhorse with no more than two holes being drilled in the cross member of the sawhorse. The simplicity of the support attachment allows for quick adjustment and the caster arrangement assures that the roller is always properly positioned for engagement by the work piece and will maintain alignment with the work piece as it moves.

What is claimed is:

1. A roller support for a work piece comprising, a base, a support attachment including a roller assembly having a pair of spaced apart side plates having top and bottom ends, a roller mounted at the top end of the said roller assembly and said bottom end being open to receive said base, said base being straddled by said side plates, and a bolt means connecting said side plates to said base for vertically adjustably positioning said side plates for roller assembly attachment for said roller assembly attachment to support a saw work piece, wherein said roller is swivelly mounted on the upper end of said pair of side plates.

2. The structure of claim 1 wherein said swivel mounting for said roller is disposed at an angle to the vertical for maintaining by gravity said swiveled roller pivoted away from an advancing work piece.

3. The structure of claim 2 wherein said side plates are angled away from an advancing work piece and cause said swiveled roller to pivot away from said advancing work piece.

4. The structure of claim 1 wherein said swivel mounting for said roller is disposed vertically.

5. The structure in claim 4 wherein said side plates are positioned vertically.

6. The structure of claim 1 and said bolt means includes a first bolt extending through said base and received in elongated slots in said pair of side plates.

7. The structure of claim 6 and said bolt means includes a second bolt extending through said side plates and engaging said base.

8. The structure of claim 7 wherein said second bolt extends through said base and said slots in said side plates.

9. The structure of claim 1 and said bolt means includes a first bolt extending through said base and received in elongated slots in said pair of side plates.

10. The structure of claim 9 wherein said second bolt is positioned on top of said base.

11. The structure of claim 10 wherein said elongated slots are arcuate to allow said side plates to pivot about an axis through said second bolt.

12. The structure of claim 9 wherein said elongated slots are straight.

13. The structure of claim 12 and said second bolt is positioned in said slots.

14. The structure of claim 13 wherein said second bolt extends through said base.

15. The structure of claim 14 and an elongated downwardly facing channel shaped member movably positioned on a plurality of said roller with said plurality of roller being positioned between spaced apart legs forming said channel, said plurality of roller support said channel and said channel supports workpiece being moved.

16. The structure of claim 11 and an elongated downwardly facing channel shaped member movably positioned on a plurality of said roller with said plurality of roller being positioned between spaced apart legs forming said channel, said plurality of roller support said channel and said channel supports workpiece being moved.

* * * * *